Nov. 10, 1959 D. A. STOLTENBERG 2,912,110
FILTER PRESS
Filed May 29, 1957 2 Sheets-Sheet 1

INVENTOR.
DONALD A. STOLTENBERG
BY
*Marechal, Biebel, French & Bugg*
ATTORNEYS

Nov. 10, 1959  D. A. STOLTENBERG  2,912,110
FILTER PRESS
Filed May 29, 1957  2 Sheets-Sheet 2
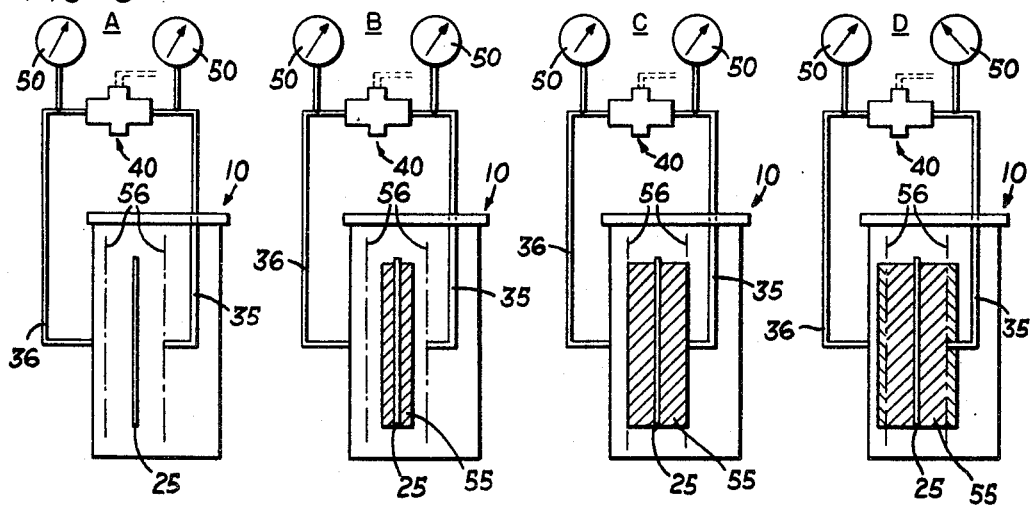
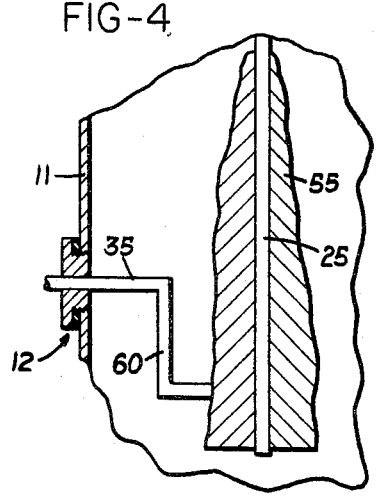
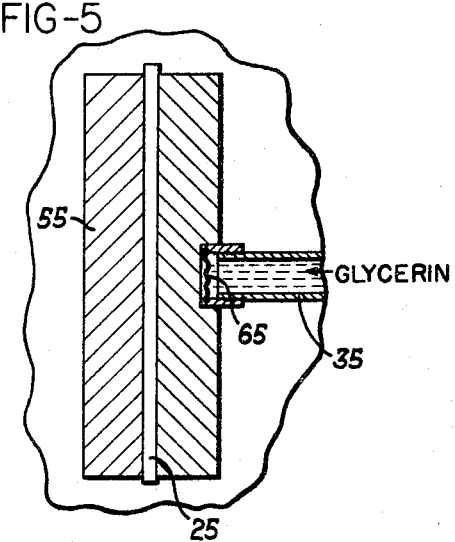
INVENTOR.
DONALD A. STOLTENBERG
BY
Marechal, Biebel, French & Bugg
ATTORNEYS

United States Patent Office 2,912,110
Patented Nov. 10, 1959

2,912,110

FILTER PRESS

Donald A. Stoltenberg, Dayton, Ohio, assignor to The Duriron Company, Inc., Dayton, Ohio, a corporation of New York Application May 29, 1957, Serial No. 662,443

8 Claims. (Cl. 210—90)

This invention relates to filters and more particularly to an apparatus for determining the thickness of residue, in the form of filter cake, deposited on a filter leaf within a pressure filter.

Filtering apparatus of the type utilizing a plurality of aligned leaves within a pressure container having inlet and outlet openings must be periodically drained and the deposited residue material flushed or otherwise cleaned from the filter leaves. Since most filter leaves are fairly easily bent or ruptured, it is preferred that the filter cake be removed before it has been allowed to grow too thick and damage the filter leaves. On the other hand, it is both unnecessary and uneconomical to interrupt the filtering operation prior to the time the filter cake has attained optimum thickness.

Present day control of filter cake thickness is normally effected by a time control mechanism which periodically interrupts the flow of incoming fluid in order that a cleaning operation can be performed. The difficulty with time control resides in part in the fact that various factors, such as the percentage of solids contained in the fluid and the pressure in the filter may vary between fairly wide limits, so that the filter cake may build up much more quickly than anticipated or, alternatively, may not build up as rapidly as expected. Thus, where the filter operates strictly on a time control basis, the thickness of the filter cake can easily vary from too little to too great.

It is therefore a principal object of this invention to provide a pressure sensing apparatus responsive to the thickness of filter cake in a pressure filter when such thickness reaches a predetermined value.

Another object of this invention is the provision of a control apparatus which is responsive to the presence of a predetermined maximum filter cake thickness.

Other objects and advantages of this invention will be apparent from the following description, the accompanying drawings and the appended claims.

In the drawings—

Figs. 3A–D are a series of somewhat schematic diagrams showing the manner in which the filter cake thickness increases and causes actuation of the control apparatus;

Fig. 4 is a schematic showing of a slightly modified probe arrangement for use with the control apparatus; and Fig. 5 is a cross sectional view of a modified type of probe of particular utility when corrosive materials are being filtered.

Figure 1:
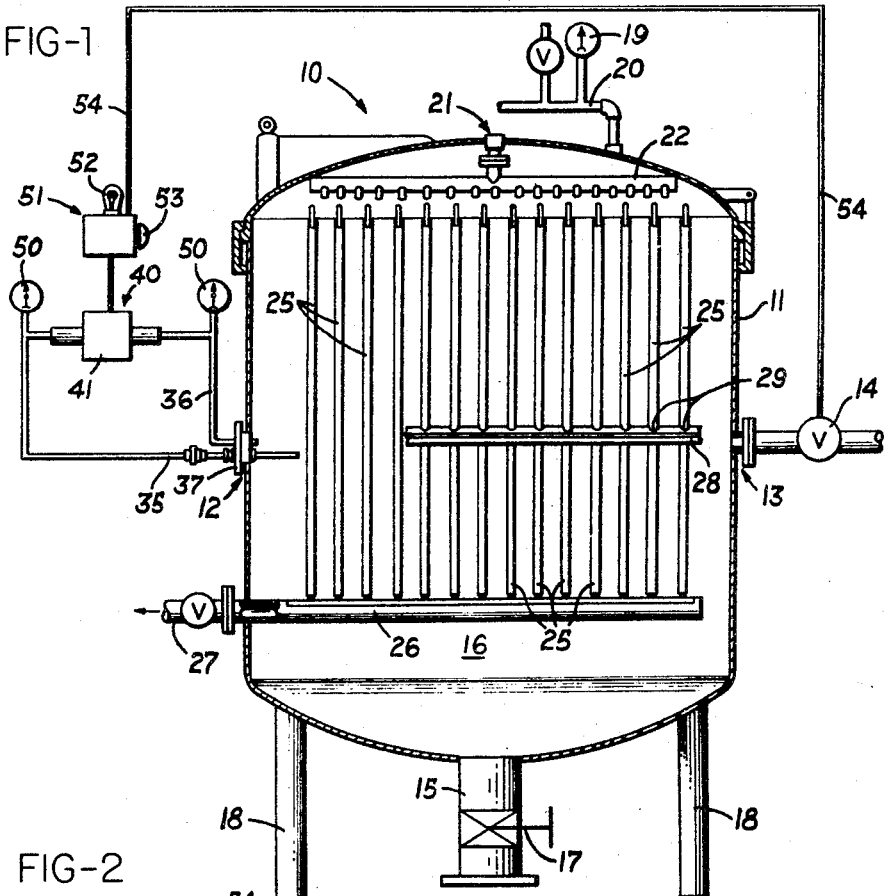
Fig. 1 is a vertical sectional view through a pressure leaf filter and the control apparatus for indicating the thickness of filter cake on the pressure leaf.
Figure 2:
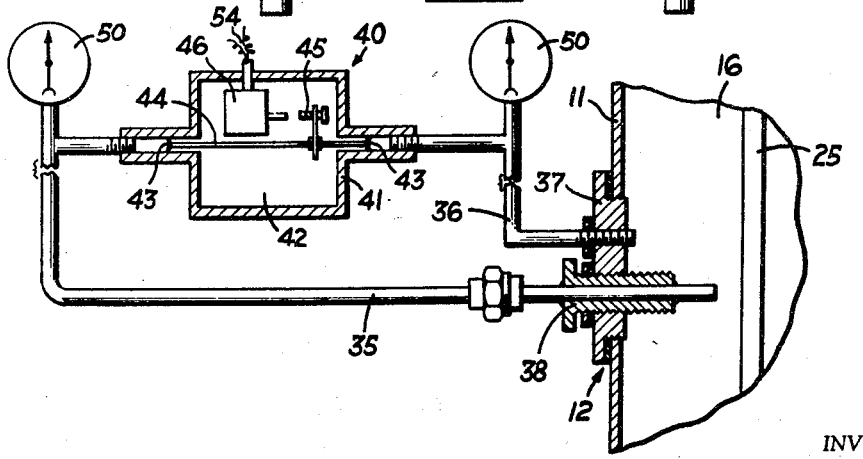
Fig. 2 is an enlarged sectional view of the control apparatus shown in Fig. 1 and showing a portion of one of the filter leaves.

Referring to Fig. 1 of the drawings which illustrates one type of apparatus with which the present invention can be used, a pressure filter 10 comprises a closed tank 11 having inlet openings 12 and 13 arranged on opposite sides thereof. The flow through inlet 13 is controlled by a valve 14 which may be operated either manually or by any suitable automatic means, depending somewhat upon the manner in which the filtering operation is arranged. A drain 15 extends from the bottom of tank 11 for emptying the confined pressure retaining chamber 16 and is controlled by a valve 17 which may be operated similarly to valve 14. Filter 10 is supported by a plurality of legs 18 and also has a pressure gage 19 operably connected to chamber 16 through pipe 20 to indicate the confined pressure within the filter.

A sluicing apparatus 21, which has an inlet end attached to the upper wall of tank 11, extends downwardly into the chamber so that its horizontally extending spraying arm 22 can spray water, or other rinsing fluid, over a plurality of aligned pressure filter leaves 25.

The filter leaves 25 are connected at their lower ends to a collecting manifold 26, this manifold being connected to the outside of tank 11 through outlet 27, while each individual leaf 25 is held in spaced relationship with respect to its adjoining leaves by a spacer bar 28. Bar 28 extends around the interior surface of the side wall of tank 11 and has a plurality of spaced notches 29 for engagement with the edge portions of the filtering leaves to hold them in position.

As mentioned, the particular filtering apparatus described is only to illustrate one of the various types of apparatus to which the present invention is adaptable, since, the invention can also be effectively applied to other types of filters and similar related apparatus.

Turning now to a description of the invention, in order that the filter cake does not become too thick and bend the filter leaves, inlet opening 12 is provided with an elongated tubular probe 35 which has an opening on the inner end adjacent the nearest filter leaf 25 for transmitting the pressure adjacent the leaf to a point outside of tank 11. A second tubular pressure transmitting probe 36 also extends through inlet opening 12, but this probe terminates just inside of fastening device 37 which connects both probes 35 and 36 to tank 11. The two probes define pressure sensing means for transmitting pressures to a point removed from the tank 11. Probe 35 is adjustably mounted within fastening device 37 by a threaded sleeve 38 to provide for relative positioning of its inner end with respect to the adjoining screen 25. Although it is possible for probe 36 to be connected to tank 11 at any point, it is preferred that it be positioned at approximately the same vertical elevation as probe 35 to eliminate possible differences in transmitted pressures resulting from differences in the static head.

From fastening device 37 the probe 35 extends to one side of a differential pressure switch 40 while the probe 36 extends to the other side of pressure switch 40. The differential pressure switch comprises a casing 41 having an inner chamber 42 which is sealed at each end by opposed diaphragms 43, these diaphragms being connected by an elongated connecting arm 44. A switch arm 45 is adjustably attached to the arm 44 for contact with a micro-switch 46 when the pressures acting on the diaphragm diverge in a manner causing movement of the connecting arm.

Where desired, probes 35 and 36 may be provided with pressure indicating gages 50 to inform the operator of the pressures present within the two probes at all times, or, pressure differential responsive control means 51 may be connected to micro-switch 46 for actuation when the pressure differential between the diaphragms 43 causes closure of the switch 46. The control means 51 may include signalling or warning means such as a light 52, a bell 53 or any other suitable device which will warn the operator that the cake thickness has reached the predetermined value and that the flow of fluid into tank 11 should be stopped. In addition to or in place of merely producing a signal or indication, the control means 51 may serve to actuate other apparatus for such purpose as desired, as for shutting off the supply of liquid, spraying, vibrating, backwashing, draining, or the like. This is illustrated in Fig. 1 in which electrical wires 54 lead from control means 51 to valve 14 to provide for automatic closure of the valve in response to actuation of micro-switch 41, thus interrupting the flow of incoming fluid into the tank automatically.

Referring to Fig. 3A a filter leaf 25 is shown devoid of any filter cake, as it would be at the beginning of a filtering operation and is shown in Fig. 3D with the maximum allowable thickness of filter cake 55 deposited thereon. For the purpose of illustration the probes 35 and 36 have been placed on opposite sides of the tank with the pressure receiving end of probe 35 placed a predetermined distance from the surface of filter plate 25 and the end of probe 36 terminating just inside tank 11. The distance indicated by dotted lines 56 is approximately at or slightly less than, and corresponds to a predetermined proportion, such as 95% of the maximum allowable thickness of filter cake 55, the remaining 5% of the filter cake being deposited around the open end of probe 35. It will be seen by reference to the pressure gages 50, shown in Figs. A, B, and C of Fig. 3, that as long as both probes are exposed the pressures transmitted by probe 35 and probe 36 are identical. However, once the filter cake thickness begins to exceed the 95% filter cake thickness indicated in Fig. 3C and approaches the maximum allowable filter cake thickness illustrated in Fig. 3D, the pressure being transmitted by probe 35 begins to drop. The drop in pressure within the probe is caused by the blocking of the inlet end of the probe 35 by the filter cake 55. The pressure drop results from the necessity for the fluid pressure to pass through the increased filter cake thickness to reach the inlet end of the probe 35.

Although the pressure within probe 35 begins decreasing as soon as the filter cake thickness exceeds 95% of the maximum thickness, it is not until the maximum thickness is acquired that connecting arm 44 of differential pressure switch 40 will move sufficiently to cause actuation of micro-switch 46. As indicated the closing of micro-switch 46 will actuate control means 51 and the appropriate signalling or interrupting means will be actuated.

When the supply of fluid has been stopped the last tank full of fluid is drained from the tank 11 through drain 15 and the sluicing apparatus 21 then started to strip the filter cake from the leaves 25 and discharges the solid material through drain 15. With the filter cake removed and the tank thoroughly flushed the filter leaves are prepared for subsequent filtering operations by flowing fluid through tank 11 to deposit a coating of diatomaceous earth on the leaves. With the coating thus applied the filter is in condition for resumption of a normal filtering operation.

As mentioned earlier, the ends of probes 35 and 36 are normally positioned at approximately the center position of the filter plates so there will be no disparity between the static pressure head acting on each of them. However, occasionally it is desirable to place the inner end of probe 36 near the bottom of leaves 25. One such instance is illustrated in Fig. 4 where due either to the size of particles carried in the fluid or to the rate of flow, the build up of filter cake on the filter leaf is not uniform throughout the height thereof. When such conditions occur the filter cake build up will be much more pronounced at one end of the filter leaf than at the other and it becomes desirable for the inner end of the probe to be located near the point where maximum build up is anticipated. One means of accomplishing this is shown in Fig. 4 where the inlet end of probe 35 has been displaced toward the lower end of the filter leaf by adding a vertically extending length 60 to the probe. Such an arrangement permits vertical adjustment of the probe without constructing additional inlet openings in the casing of tank 11.

Another problem is often encountered where a fluid to be filtered is corrosive, e.g., a caustic solution. Transmission of this fluid through probes 35 and 36 into the differential pressure switch 40 and pressure gages 50 would greatly decrease their anticipated service life. To overcome this, the inlet end of the probes are sealed with a diaphragm 65, as shown in Fig. 5, and the entire probe, gages, and inlets of the differential pressure switch filled with a pressure transmitting fluid such as glycerin. Thus the presence of a corrosive medium within tank 11 will not detrimentally affect the operating medium associated with probes 35 and 36.

While the forms of apparatus herein described constitute the preferred embodiments of the invention, it is to be understood that these inventions are not limited to these precise forms of apparatus and that changes may be made therein without departing from the scope of the invention which is defined in the appended claims.

What is claimed is:

1. A filter press of the leaf type for removing material from a fluid medium and having protection against excessive accumulation of filter cake on the leaves thereof comprising a closed casing having an inlet opening for the supply of said fluid medium and an outlet opening for the discharge of the filtered fluid, a filtering element including a plurality of spaced filter leaves mounted within said casing and adapted to accumulate a deposit on the surface thereof as a filter cake increasing in thickness as the fluid medium passes therethrough, a connection from the interior of said filtering element to said outlet, a first pressure sensing means within said casing located in predetermined spaced relation with said filtering element and adapted to respond selectively upon increase in thickness of said filter cake to a predetermined points determined by said spacing, a second pressure sensing means continuously responsive to the pressure within said chamber beyond said filter cake, and means controlled by the correlation of said first and second pressure sensing means for producing an indication when the thickness of said accumulated filter cake reaches said predetermined point.

2. A filter press of the leaf type for removing material from a fluid medium and having protection aaginst excessive accumulation of filter cake on the leaves thereof comprising a closed casing having an inlet opening for the supply of said fluid medium and an outlet opening for the discharge of the filtered fluid, a filtering element including a plurality of spaced filter leaves mounted within said casing and adapted to accumulate a deposit on the surface thereof as a filter cake increasing in thickness as the fluid medium passes therethrough, a connection from the interior of said filtering element to said outlet, a first sensing means within said casing located in predetermined spaced relation with said filtering element and adapted to respond selectively upon increase in thickness of said accumulated filter cake to a predetermined point of maximum desired thickness as determined by said spacing, a second pressure sensing means continuously responsive to the pressure within said chamber beyond said filter cake, and a differential pressure responsive device connected to both said pressure sensing means for producing a response upon the sensing of a differential pressure by said sensing means resulting from the increase in thickness of said filter cake to said maximum desired thickness.

3. A filter press of the leaf type for removing material from a fluid medium and having protection against excessive accumulation of filter cake on the leaves thereof comprising a closed casing having an inlet opening for the supply of said fluid medium and an outlet opening for the discharge of the filtered fluid, a filtering element including a plurality of spaced filter leaves mounted within said casing and adapted to receive a deposit on the surface thereof as a filter cake increasing in thickness as the fluid medium passes therethrough, a connection from the interior of said filtering element to said outlet, a first pressure sensing means within said casing located in predetermined spaced relation with said filtering element and adapted to respond selectively upon increase in thickness of said filter cake to a predetermined point determined by said spacing, a second pressure sensing means continuously responsive to the pressure within said chamber beyond said filter cake, and means controlled by the correlation of said first and second pressure sensing means when the thickness of said filter cake reaches said predetermined point for interrupting the filtering operation.

4. For use with a filter press including a closed casing having a filtering element therein connected between inlet and outlet openings for removing entrained material from a fluid medium passed therethrough to form a filter cake thereon, the combination of a filter cake thickness responsive mechanism comprising a pair of pressure sensing probes connected to the interior of said casing, one of said probes being located in predetermined spaced relation with said filtering element corresponding to the maximum desired thickness for the filter cake formed thereon, the other of said probes being spaced at a greater distance from said filtering element and continuously responsive to the pressure within said casing, and differential pressure responsive means connected to said probes for producing a response upon the sensing of a differential pressure by said probes resulting from increase of the thickness of said filter cake up to said maximum desired thickness.

5. For use with a filter press including a closed casing having a filtering element therein connected between inlet and outlet openings for removing entrained material from a fluid medium passed therethrough to form a filter cake thereon, the combination of a filter cake thickness responsive mechanism comprising a pair of pressure sensing probes connected to the interior of said casing, one of said probes being located in predetermined spaced relation with said filtering element corresponding to the maximum desired thickness for the filter cake formed thereon, the other of said probes being spaced at a greater distance from said filtering element and continuously responsive to the pressure within said casing, and means controlled by the correlation of the pressures sensed by said probes for producing a response upon the sensing of a differential pressure resulting from a predetermined increase of the thickness of said filter cake.

6. For use with a filter press including a closed casing having a filtering element therein connected between inlet and outlet openings for removing entrained material from a fluid medium passed therethrough to form a filter cake thereon, the combination of a filter cake thickness responsive mechanism comprising a pair of pressure sensing probes filled with pressure transmitting fluid and having pressure sensitive ends both extending into the interior of said casing, one of said probes having its pressure sensitive end located in predetermined spaced relation with said filtering element corresponding to the maximum desired thickness for the filter cake formed thereon, the other of said probes having its sensitive end spaced at a greater distance from said filtering element and continuously responsive to the pressure within said casing, and differential pressure responsive means connected to said probes for producing a response upon the sensing of a differential pressure by said probes resulting from increase of the thickness of said filter cake up to said maximum amount.

7. For use with a filter press including a closed casing having a filtering element therein connected between inlet and outlet openings for removing entrained material from a fluid medium passed therethrough to form a filter cake thereon, the combination of a filter cake thickness responsive mechanism comprising a pair of pressure sensing probes connected to the interior of said casing, one of said probes being located in predetermined spaced relation with said filtering element corresponding to the maximum desired thickness for the filter cake formed thereon, the other of said probes being spaced at a greater distance from said filtering element and continuously responsive to the pressure within said casing, a differential pressure switch operably connected between said probes, and means responsive to actuation of said pressure switch affording an indication that the filter cake has reached said maximum thickness.

8. For use with a filter press of the leaf type including a closed casing having filtering leaves therein connected between inlet and outlet openings for removing entrained material from a fluid medium passed therethrough to form a filter cake thereon, the combination of a filter cake thickness responsive mechanism comprising a pair of pressure sensing probes connected to the interior of said casing, one of said probes being located in predetermined spaced relation with one of the filter leaves of said filtering element corresponding to the maximum desired thickness for the filter cake formed thereon, the other of said probes being spaced at a greater distance from said filtering element and continuously responsive to the pressure within said casing, a differential pressure switch operably connected between said probes, and means operated by said switch for terminating further operation of said filter press when said maximum desired thickness of accumulated filter cake has been reached.

References Cited in the file of this patent

UNITED STATES PATENTS

| | | |
|---|---|---|
| 1,227,983 | Vallez | May 29, 1917 |
| 2,480,320 | Carrier | Aug. 30, 1949 |
| 2,547,430 | Aldridge et al. | Apr. 3, 1951 |
| 2,632,566 | Morrison | Mar. 24, 1953 |